Patented July 15, 1941

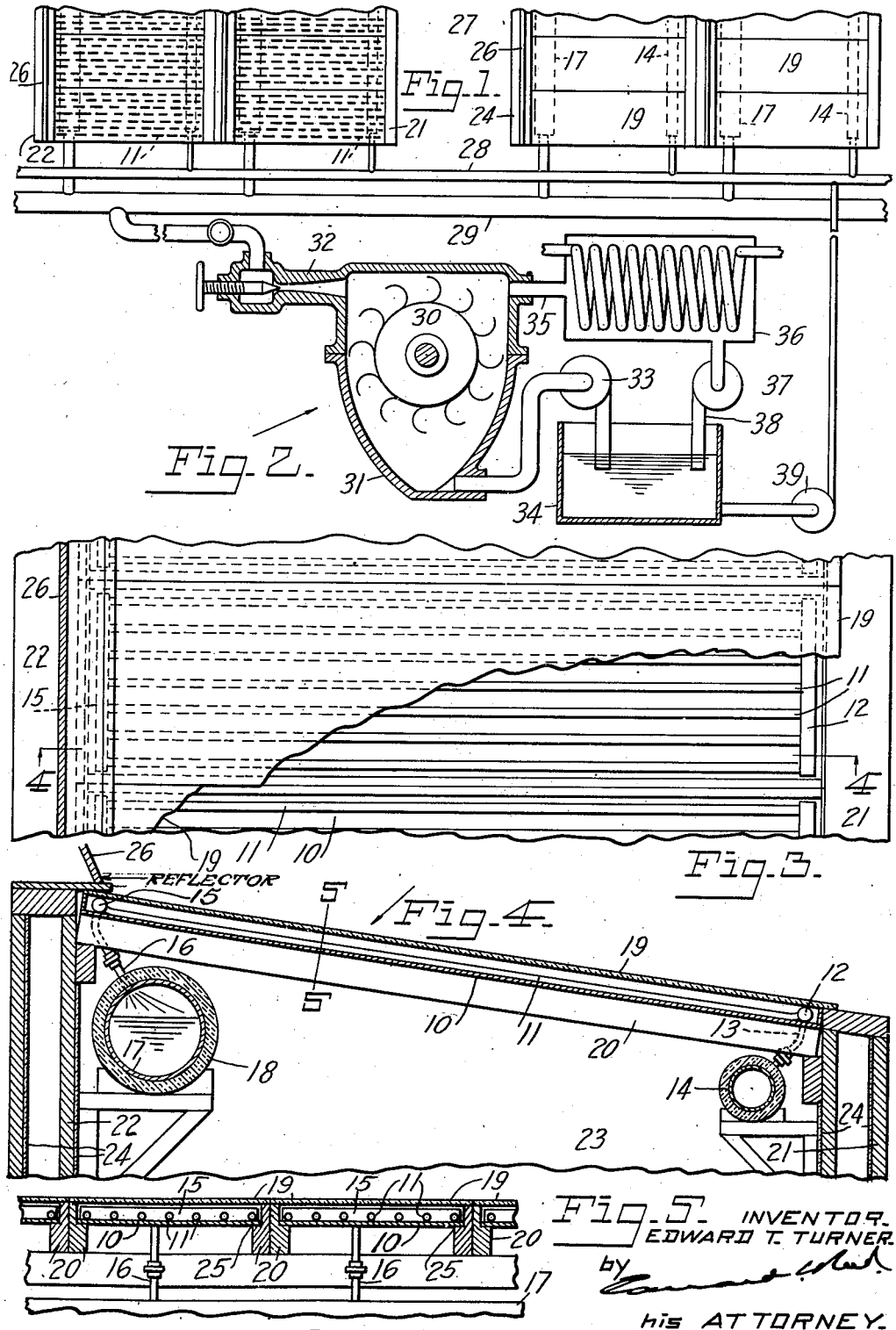

2,249,642

UNITED STATES PATENT OFFICE 2,249,642

SOLAR POWER APPARATUS

Edward T. Turner, Dayton, Ohio

Application January 27, 1938, Serial No. 187,253

2 Claims. (Cl. 126—271)

This invention relates to an apparatus for utilizing solar heat to develop power.

One object of the invention is to provide a solar heater of simple construction which will have high efficiency.

A further object of the invention is to provide a solar heater of simple construction which will heat water under pressure substantially to its temperature of vaporization.

To this end it is a further object of the invention to provide a solar heater having a large heat absorbing capacity and small heat radiation.

A further object of the invention is to provide a solar heater comprising a series of sections or units, any number of which may be assembled in a single heater to provide the same with the desired capacity.

A further object of the invention is to provide means for storing the heated water and maintaining the same at a high temperature and a high pressure.

A further object of the invention is to provide means for utilizing the heated water in the generation of power.

Other objects of the invention may appear as the apparatus is described in detail.

In the accompanying drawing Fig. 1 is a plan view of a portion of a solar heating apparatus comprising a plurality of heaters; Fig. 2 is an elevation, partly in section, of a power apparatus to be actuated by water heated by said heater; Fig. 3 is a plan view, partly broken away, of one of the heaters of said heating apparatus; Fig. 4 is a sectional view taken on the line 4—4 of Fig. 3; and Fig. 5 is a section taken through a portion of said heater on the line 5—5 of Fig. 4.

In the drawing I have shown, by way of illustration, one embodiment of my invention in which the heater comprises a series of separate sections or units, any number of which may be assembled in a single heater to provide the latter with the desired capacity for hot water. It will be obvious, however, that the invention may be embodied in a single unit of such size as to provide the desired heating capacity.

This heater, and each section of a sectional heater, comprises a base 10 of heat absorbing material, such as copper, and supported by this base and in heat receiving relation thereto is a series of small tubes 11 which are preferably mounted directly upon and secured to the base, as by soldering. The tubes may be supported on either the upper surface or the lower surface of the base but are here shown as mounted on the upper surface. The individual sections of a sectional heater may be of any desired size and shape and they may conveniently be rectangular in shape and of a width of approximately one foot and of a length of approximately fifteen feet. The tubes may be of relatively thin copper of one-eighth of an inch diameter and in the particular arrangement here shown I have employed straight tubes and have spaced the same laterally one from the other a distance of about two inches. The tubes extend for substantially the full length of the base and the several tubes of each section are connected at one end of the base with an inlet header 12 which in turn is connected by a tube 13 to a supply pipe 14 for water under pressure. At the other end of the base the several tubes are connected with an outlet header 15 which is connected by a tube 16 with a discharge conduit 17. In the particular construction here illustrated this discharge conduit is of large capacity and serves both as a discharge conduit and as a storage chamber for the heated water and for this purpose it is provided with a covering 18 of insulating material. A transparent cover 19, preferably in the form of a sheet of glass, is arranged above and in spaced relation to the tubes. The base and the transparent cover may be supported in any suitable manner. In the present construction the base of each section is supported at its lateral edges on parallel rails 20 which are supported at their ends on a suitable supporting structure, in a more or less elevated position. Preferably this supporting structure is in the form of a housing comprising side walls 21 and 22, on which the respective ends of the rails are supported, and end walls 23. The walls of this supporting structure are preferably insulated against the transmission of heat, as by providing the same with one or more layers of heat insulating material 24. In the arrangement shown, the rails 20 are provided with shoulders 25 (Fig. 5) on which the base plate rests and each rail extends upwardly beyond that shoulder to support the glass cover 19 above the tubes. The supporting structure is preferably of a substantial length and is adapted to receive and support a series of sections, as shown in Fig. 5, the sections being arranged edge to edge in close relation one to the other so as to form a closure for the top of the supporting structure. While I have here shown a separate glass cover for each section it will be obvious that a single plate of glass could be arranged above two or more of these sections and when this is done those portions of the intermediate rails 20 above the shoulders 25 may be omitted or may be of such a character as to merely support the glass without preventing open communication between the adjacent sections. In either arrangement the tubes of the section or sections are enclosed in a housing formed between the base and the cover, closed at its sides by the upper portions of the rails and closed at its ends by the side walls 21 and 22 of the supporting structure.

Each section of the heater is preferably inclined so that the tubes thereof will slope upwardly from the inlet header 12 to the outlet header 15, this inclination being secured in the arrangement shown by making the one wall, 21, of the supporting structure of less height than the other wall, 22. By so sloping the several sections, or heating elements, of the heater the air which is confined about the tubes within the housing, as it becomes heated, will move upwardly toward the upper end of the section where the tubes and the water therein are at the highest temperature, thus minimizing radiation at the lower portion of the section and increasing the efficiency of the unit. This sloping arrangement of the sections also enables the water to be moved slowly and uniformly through the tubes and, further, it permits of the heater being so arranged that the sun's rays will be approximately perpendicular to the surface thereof throughout a substantial portion of the day. If desired, a reflector 26 may be arranged at the upper end of the heater to reflect additional rays of the sun onto the upper part of the heater and thus impart additional heat to the water at the place it is to be raised to the highest temperature and where the radiation is greatest.

The base and the tubes themselves will both absorb heat from the sun's rays and the heat absorbed by the base will be conducted to the tubes to further heat the same. Both the base and the tubes are preferably covered with a suitable substance, such as lamp black, which will increase their absorbing capacity and will minimize radiation. It is not essential that the tubes should be exposed to the sun's rays and when arranged beneath the base they will receive heat from the base by conduction. As a result of this arrangement the water as it moves slowly through the tubes, under pressure, will accumulate heat in substantial quantities, so that it may be discharged through the outlet header 15 at a temperature approximating its temperature of vaporization. The water thus discharged from the heating elements at high temperature and high pressure is conducted through the discharge conduit 17, or through any other suitable channel, to the point of use. Any suitable reservoir may be provided for storing the heated water under pressure until needed and by utilizing the discharge conduit as a storage reservoir this storage is effected with a minimum of loss of heat, due not only to the insulation of the conduit itself but due also to the fact that the conduit is enclosed within the supporting structure and there is no circulation of air about the same. The water entering the reservoir will be partially vaporized so that the water in the reservoir will be under the pressure of the steam, which will accumulate in the upper portion of the reservoir. If water is withdrawn from the reservoir faster than it is supplied thereto a slight reduction in pressure will result and cause the vaporization of additional water and the pressure will be substantially maintained. Thus the water will be maintained at a substantially constant pressure even though the water in the reservoir is greatly reduced in quantity. The lower surface of the base 10 will radiate some heat to the air within the supporting structure and this air will be heated, but the hottest air will rise to the top of the structure in contact with the base and there will be but little loss of heat due to this radiation.

In a large capacity heater it will usually be desirable to provide a plurality of series of sections, each series being carried by a separate supporting structure. In order that each series of heating units may be readily accessible the several series may be arranged in pairs, as shown in Fig. 1, and the adjacent pairs spaced one from the other to provide between them passageways 27. With this arrangement the water supply conduits 14 of the several series of sections would be connected with the source of water supply by means of a main conduit 28, and the discharge conduits 17 of the several series of sections would be connected with a conduit 29 leading to the point of use.

In the present embodiment of the invention the water, which is delivered from the heater at high temperature and high pressure, is utilized in the operation of power apparatus. This apparatus may be of any suitable type and that here illustrated is substanially similar to the power apparatus shown and described in my copending application for patent filed January 27, 1938, Serial No. 187,252, this apparatus comprising a power element, such as a Pelton wheel 30, which is mounted in a casing 31, and the conduit 29 which leads from the several discharge and storage conduits 17 is connected with this casing by means of an expansion nozzle 32. When the water at high temperature and high pressure is passed through this nozzle 32 a portion of the water is converted, or flashed, into steam and the steam is expanded and mixed with the water to convert heat and pressure energies into velocity energy, so that the mixture of water and steam will be discharged from the nozzle with a velocity energy sufficient to operate the power element. After having acted upon the power element the water and steam may be disposed of in any suitable manner but preferably they are recovered and again returned to the heater for use. In the arrangement shown, the water is withdrawn from the lower portion of the casing 31, as by means of a pump 33, and delivered to a low pressure reservoir or tank 34. The steam is withdrawn from the upper portion of the casing through an outlet conduit 35 and delivered to a condenser 36. The condensate is withdrawn from the condenser, as by means of a pump 37, and delivered through a conduit 38 to the reservoir 34. The condensate and withdrawn water are stored in this reservoir and, as required, are withdrawn therefrom by a pump 39 which is connected by the main water conduit 28 with the supply conduits 14 of the several series of heating elements. Thus the same water may be utilized over and over again, with the addition of only so much water as is required to compensate for losses.

It will be understood that the water from the heater is stored in the storage conduit, or other receptacle, while the sun is shining and will be maintained at high temperature and high pressure for a substantial period of time after the sun has ceased to shine and is thus available to operate the power apparatus at night or during cloudy intervals. The water and condensed steam are stored in the low pressure tank 34 and are available for use when needed. The pump 39 which returns the water and condensate to the heater will be operated only when the sun is shining, and at such times as the sun is not shining, and the pump is not operating, the water and condensate will merely accumulate in the tank and will be stored therein for future use.

While I have shown and described one embodiment of my invention I wish it to be understood that I do not desire to be limited to the details of the same as various modifications may occur to a person skilled in the art.

Having now fully described my invention, what I claim as new and desire to secure by Letters Patent, is:

1. In a solar heating apparatus, a housing having upright walls closing the sides and ends thereof, a heater comprising a base of heat absorbing material, a plurality of tubes supported in heat receiving relation to said base, and a transparent closure above said base, said heat absorbing base extending across and closing the top of the housing, means for supplying water to said tubes at one end of said base, an insulated storage receptacle arranged within said housing, and means for connecting said receptacle with said tubes at the other end of said base.

2. In a solar heating apparatus, a housing having upright walls closing the sides and ends thereof, a heater supported by said housing and comprising a plurality of sections, each section including a base of heat absorbing material, a plurality of tubes supported in heat receiving relation to said base, inlet and outlet headers connected with the respective ends of said tubes, and a transparent closure, the bases of said sections being supported side by side by the side walls of said housing and forming a closure for said housing, a supply conduit connected with the inlet headers, and a combined discharge and storage receptacle supported within said housing, extending lengthwise thereof and connected with said outlet headers.

EDWARD T. TURNER.